(12) United States Patent
Nettleton et al.

(10) Patent No.: US 7,788,227 B1
(45) Date of Patent: Aug. 31, 2010

(54) SCHEMA SIGNING AND JUST-IN-TIME INSTALLATION

(75) Inventors: David J. Nettleton, Seattle, WA (US); Jason T. Hunter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 11/367,212

(22) Filed: Mar. 3, 2006

(51) Int. Cl.
*G06F 7/00* (2006.01)
*G06F 17/00* (2006.01)
*G06F 15/16* (2006.01)

(52) U.S. Cl. .................. 707/640; 717/174; 726/10
(58) Field of Classification Search ............ 707/640; 717/174; 726/10
See application file for complete search history.

(56) References Cited

U.S. PATENT DOCUMENTS

| | | | |
|---|---|---|---|
| 6,009,176 A | 12/1999 | Gennaro et al. | |
| 6,041,411 A * | 3/2000 | Wyatt | 726/29 |
| 6,088,717 A * | 7/2000 | Reed et al. | 707/204 |
| 6,360,218 B1 | 3/2002 | Zander et al. | |
| 6,401,239 B1* | 6/2002 | Miron | 707/203 |
| 6,411,961 B1* | 6/2002 | Chen | 707/102 |
| 6,636,870 B2 | 10/2003 | Roccaforte | |
| 6,842,741 B1 | 1/2005 | Fujimura | |
| 6,891,953 B1* | 5/2005 | DeMello et al. | 380/277 |
| 2002/0049749 A1* | 4/2002 | Helgeson et al. | 707/3 |
| 2003/0018786 A1 | 1/2003 | Lortz | |
| 2003/0095660 A1* | 5/2003 | Lee et al. | 380/231 |
| 2004/0024688 A1* | 2/2004 | Bi et al. | 705/37 |
| 2004/0193388 A1 | 9/2004 | Outhred et al. | |
| 2005/0050516 A1* | 3/2005 | Mysore | 717/114 |
| 2005/0071801 A1* | 3/2005 | Jesse et al. | 717/100 |
| 2005/0091259 A1* | 4/2005 | Parthasarathy et al. | 707/102 |
| 2005/0102297 A1 | 5/2005 | Lloyd et al. | |
| 2005/0114653 A1 | 5/2005 | Sudia | |
| 2005/0262480 A1 | 11/2005 | Pik et al. | |
| 2006/0259458 A1* | 11/2006 | Hunter et al. | 707/2 |

FOREIGN PATENT DOCUMENTS

| | | |
|---|---|---|
| KR | 20040034327 A | 4/2004 |
| KR | 20040083988 A | 10/2004 |

OTHER PUBLICATIONS

A. S. Tanenbaum and M. van Steen. Distributed Systems: Principles and Paradigms. Prentice-Hall, Upper Saddle River, New Jersey, USA, 2002, Title Pages and Chapter 8, pp. iii-v and 413-491.*
International Search Report dated Jan. 2, 2007 for PCT Application Serial No. PCT/US2006/030737, 3 Pages.

(Continued)

*Primary Examiner*—Greta L Robinson
*Assistant Examiner*—Brian E Weinrich
(74) *Attorney, Agent, or Firm*—Turocy & Watson, LLP

(57) ABSTRACT

A system and/or methodology that enables schema motion and "just-in-time" installation thereof. Aspects of the invention employ signing technology to facilitate secure definition of schema data. These public key technologies can also be employed to facilitate verification of the document (e.g., schema) received at a destination.

19 Claims, 11 Drawing Sheets

OTHER PUBLICATIONS

OA dated Feb. 5, 2009 for U.S. Appl. No. 11/287,529, 33 pages.
OA dated Jul. 31, 2009 for U.S. Appl. No. 11/287,529, 37 pages.
OA dated Aug. 26, 2008 for U.S. Appl. No. 11/287,529, 32 pages.
OA dated Jan. 7, 2010 for U.S. Appl. No. 11/287,529, 46 pages.
OA dated Jan. 10, 2008 for U.S. Appl. No. 11/287,529, 21 pages.

* cited by examiner

SCHEMA SIGNING AND JUST-IN-TIME INSTALLATION

BACKGROUND

Technological advances in computing systems have been directed toward increasing the commonality of data thus enabling sharing, compatibility and interoperability between machines. For example, as is well known, frequently, a user may have data on one device and desire to share the data with a different device and/or application. Today, so long as the systems are pre-configured to accept specific data formats and types, computers can share data between applications and users. However, these conventional systems are not extensible. In other words, if the correct schema is not available on the destination device, the data cannot be transferred. As well, in order to maintain free data exchange, a user cannot add or modify types at an origination location (e.g., server) without the same additions and/or modifications being installed at the destination location (e.g., client). In other words, the destination location must be equipped (e.g., maintain necessary schema information) to accept incoming data from a disparate device and/or application.

Developments in computing systems have been directed to employing a platform that utilizes the benefits of database technology. Oftentimes, these developments incorporate these benefits into the file system. However, these systems share the same schema compatibility issues described above. As such, in order to effectively transfer and share data, the data in, the file system must conform to a predefined common schema(s). Of course, a schema can be defined as a declarative way of describing the form (e.g., structure) of the data.

In emerging file systems, objects can be stored in the database (e.g., file system) and, accordingly, can be described by an applicable schema. Other scenarios exist whereby an applicable schema can describe documents. For instance, XML schema not stored in a database but read for a regular file system could employ the novel functionality of schema transfer described herein.

Data in these file systems is an instance of specific schemas and types; the types are defined in the schema and define the shape (e.g., structure) of the data. If a new type is desired to be added to the system, e.g., a new set of objects or a new form of data the system can work with, the developer would need to create a schema and a type within it. Next, properties would be added to the type.

A number of scenarios exist in which data has to be saved to a file system store (or other database) for which the required schema(s)/type(s) are not already installed. This is known as the "store down-level" problem. In conventional systems, only system administrators and/or persons with specialized authorizations could install schema information.

What is needed is a system that enables uninhibited transfer of data from one machine to another while enabling that, whenever the data arrives at the second machine, the metadata that is needed with regard to the data is already present at the second machine. Additionally, there exists a substantial need in the art to transfer schema information between components while maintaining a variety of security aspects regarding the schema information including authenticity and integrity.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system and/or methodology that enables schema motion and "just-in-time" installation thereof. Aspects of the invention employ signing technology to facilitate verification of the document's authenticity and integrity (e.g., schema) upon receipt at a destination location.

The invention described herein, in one aspect thereof, can address the scenario where a client has available to it more schemas than those available to the store. It is to be understood that a schema definition can be collected in a document called a schema package. In this scenario, the invention can facilitate transfer and installation of schema package and information necessary to enable the client to interact with the store with regard to uninstalled schemas.

One novel aspect of the invention is that the invention can enable the transfer and installation of a schema and other data related thereto, "just in time." It will be appreciated that once any required schemas are installed in the file system store, data instances of types in that schema can be persisted in the store. It will further be appreciated that data of a particular type cannot be stored in the store if the required schema(s) are not installed—schema for all types in the data object tree must be installed prior to storing data corresponding to a particular schema.

In order to allow for schema information to be installed "just-in-time" a secure mechanism can be provided that ensures that appropriate schema information can be transferred with data (or by other means). These secure mechanisms include signing the schema during schema definition such that the schema is known to be signed during schema creation. The signing of a schema package can ensure that the schema is not modified prior to installation. The signing can also ensure that the schema can be installed while preventing schema squatting. In other words, in accordance with an aspect, a user with write privileges to a store can install a schema. This can be achieved as the schema contains only a declarative language that does not allow computer code to be included as part of the unit of installation (the schema package).

In accordance with security, when a schema is installed in a store, the name under which the schema is installed must include the public key token. This public key token, or other globally unique value, can be included in the name to eliminate collisions as well as to ensure authenticity and integrity of the received document (e.g., schema).

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
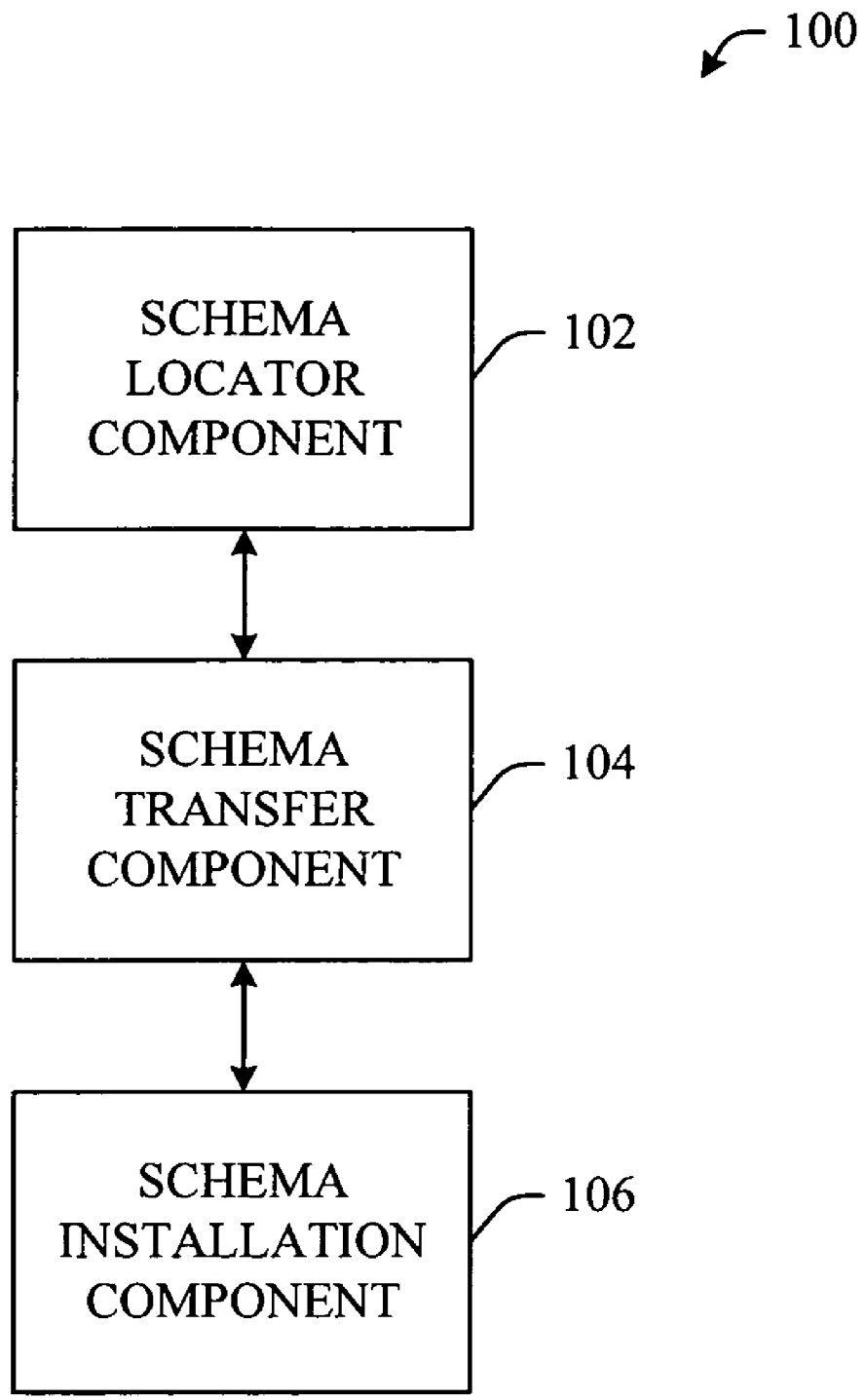
FIG. 1 is a block diagram of a system that facilitates locating, transferring and installing a schema in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As described supra, frequently, a user will have data on a computer and will want to share this data between applications and users. However, in some instances necessary information (e.g., schema) may not be available to effect the sharing of the data. There are a number of problems with the manner in which conventional systems effect sharing data. As described supra, conventional systems are not extensible. For example, it is often difficult to add types (e.g., permissions, accessibility problems). File systems often employ a platform that takes the benefits of a database and builds them into a storage file system. As such, the data in the file system can conform to a pre-defined and pre-installed schema—e.g., a declarative way of describing the form of the data.

In these emerging file systems, objects are stored in the database (e.g., file system) and are described by a specialized schema. For example, a contact schema can describe characteristics of a person. Data in these emerging file systems is an instance of these schemas' types—the types are defined within the schema and define the shape of the data. Although examples and aspects described herein are directed to database schema scenarios, it is to be understood that other scenarios and implementations of the novel functionality described herein exist whereby an applicable schema can describe documents. For instance, XML schema not stored in a database but read for a regular file system could employ the novel functionality of schema transfer described herein. These alternative aspects are intended to be included within the scope of this disclosure and claims appended hereto.

If a user desires to add a new type to the system, e.g., a new set of objects or a new form of data the system can work with, a developer would need to create and install a corresponding schema. For example, a developer can develop MySchema, and create a type, MyType wherein properties would be defined for the type.

The following scenario is provided to add context to the invention. It is to be understood that the scenario is not intended to limit the invention in any way. In particular, it is to be appreciated that the novel schema signing and just-in-time installation functionality described herein can be employed in other scenarios without departing from the spirit and/or scope of the invention.

Assume a system that has two computers (e.g., a client and a server). On a client device, the exemplary schema, MySchema is installed. If the user desires to move an object from one computer to the other, the type of that object must be known. Since the emerging file systems today are focused around sharing, they must agree on the form of data (e.g., schema) that is transmitted between devices. It is particularly important that disparate applications have a consistent experience around any particular form of data. An issue arises as to how to move metadata, e.g., description and form of data, from one device to another.

The subject invention is directed to a system and/or methodology that facilitates moving data between disparate devices and/or applications irrespective of the presence of a corresponding schema. In order to do so, the form of the data has to be defined. Moreover, the data has to be moved in a safe and secure manner while not creating barriers. For example, if an administrator was needed to install the schema upon every transfer, the remote file share would not be functional as it is unlikely that the user would be an administrator. Therefore, the subject invention is directed to a system and/or methodology that facilitates moving data, and with the data, metadata that describes the form of the data.

Aspects of the invention are directed to a system and/or methodology that facilitates secure definition and just-in-time installation of a schema. In one aspect, a schema definition component can be provided to define a unit of schema installation a Schema Package or just package (e.g., schema document) that describes the structure of the data. One issue that can be addressed by the invention is that if two schemas are developed independently, it is important that the schemas do not accidentally collide. In other words, it is important to ensure that the two types of documents do not accidentally appear to the destination machine as the same type of document.

Additionally, while transferring the package (e.g., schema), it is important to make sure that a malicious agent does not come into the middle and be able to tamper with the package so the destination thinks it is receiving the authentic package when, in fact, it has been altered. In this situation, the package that the recipient installs may not be the contract they thought they were accepting. Following is a discussion of the invention with respect to each of these problems in turn.

With respect to the first issue, in order to eliminate package (e.g., schema) collisions, it is important to ensure that two schemas that happen to describe similar types are not mistaken for each other.

Referring initially to FIG. 1, a system 100 that facilitates transferring and installing a schema is provided. In particular, system 100 can include a schema locator component 102 and a schema transfer component 104. System 100 can further include a schema installation component 106. The schema locator component 102 can facilitate the locating of a schema that corresponds to a particular instance of data. In one example, as described supra, a schema MySchema can be located via the schema locator component 102 corresponding to an instance of the type, MyType defined in that schema.

It will further be appreciated that the schema locator component 102 can be employed to locate one or more schemas that corresponds to a particular data instance. (A single schema corresponding to the data instance is assumed in the rest of the example.) In this example a schema determination component (not shown) can be employed to determine a corresponding schema related to a particular data instance. In this example, the schema locator component 102 can locate a schema that corresponds to a data instance. The schema transfer component 104 can be employed to transfer the schema to a target location. It is to be appreciated that the located schema can be transferred concurrently with the data instance or in a separate transmission. Once received, the schema installation component 106 can be employed to install the transferred schema at a target location. It will be appreciated that installation can occur "just-in-time" or preemptively or delayed as desired. This timing component of schema installation will be better understood upon a discussion of the figures that follow.

Figure 2:
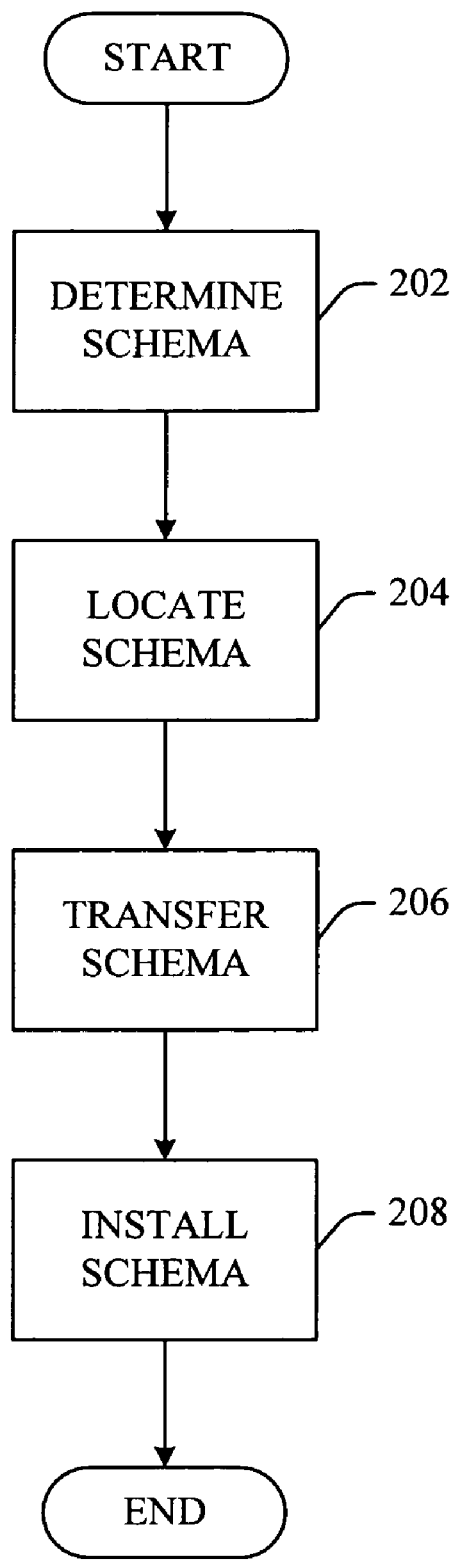
FIG. 2 illustrates an exemplary flow diagram of a methodology that effects schema motion in accordance with an aspect of the invention.

FIG. 2 illustrates a methodology of transferring and installing a schema in accordance with the invention. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, a particular schema is determined. For example, in situation where it is desired to transfer a data instance to a target, an appropriate and/or corresponding schema can be determined from the data instance information (e.g., metadata). In another example, a particular schema can be identified by a user, application, artificial intelligence (AI) reasoning means, rules-based logic or the like.

In any case, once the schema has been determined, the schema can be located at 204. As will be better understood following a discussion of the figures infra, the schema can be located from any available source. By way of example, the schema can be located by querying a schema catalog or examining some known location or resource. The schema catalog, for example, can be located in a file store, memory or other suitable location. For instance, the schema catalog can be effected via a cache or buffering means.

At 206, the schema is transferred to a target location. It is to be appreciated that any wired and/or wireless protocol or any other means connected or disconnected can be employed to transfer the schema to the target location. As will be described in greater detail infra, the schema has previously been electronically signed to ensure the authenticity and integrity of the schema information during the transfer. The schema must be signed using an encryption key and well known signing technology known to both the origin and the target.

At 208, the schema can be installed at the target location. It will be appreciated that the schema can be installed "just-in-time" to compliment and facilitate transfer of an accompanying and/or related electronic document (e.g., data instance). In other aspects, the installation of the schema can be delayed as desired by a user and/or application, but not delayed beyond the moment just before the data is itself presented for storage. As will be described in greater detail infra, the installed schema is named based at least in part on the key used in signing.

Figure 3:
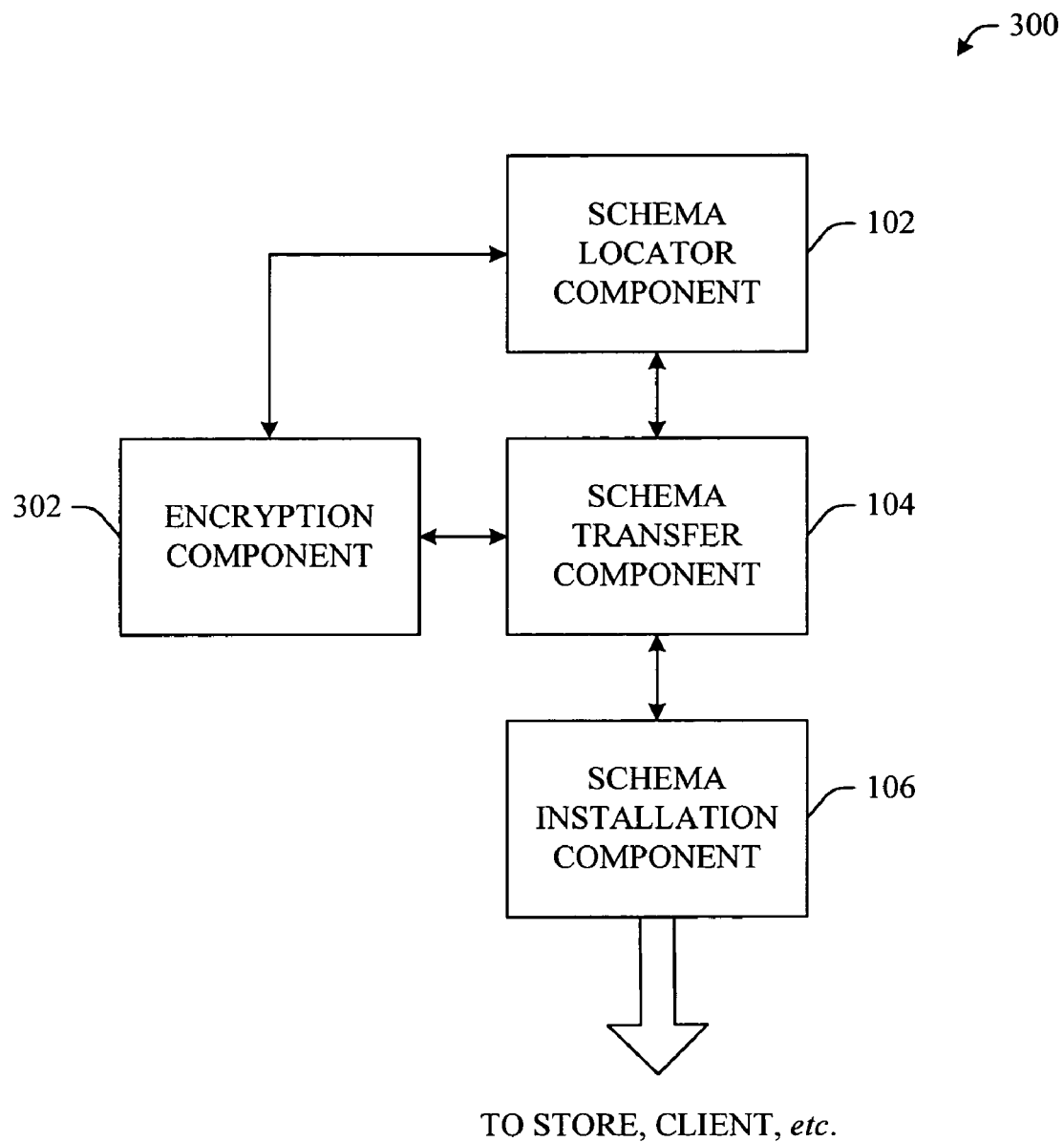
FIG. 3 illustrates a system diagram that facilitates schema signing in accordance with an aspect of the invention.

Turning now to FIG. 3, an alternate aspect of a system 300 that can effect secure transfer of a schema is shown. Generally, system 300 can include a schema locator component 102, a schema transfer component 104 and a schema installation component 106. Additionally, system 300 can include a schema encryption component 302. Schema encryption component 302 can facilitate encrypting the schema prior to transfer via the schema transfer component 104.

As illustrated in FIG. 3, it is to be appreciated that the system 300 can facilitate the transfer of an encrypted schema (e.g., schema encrypting component 302) as well as the transfer of an unencrypted schema package. For example, in the instance of transmission of sensitive and/or confidential communication/data, it can be particularly useful to securely encrypt the schema prior to transfer. This secure encrypting mechanism can prohibit unauthorized access to the communication/data. Similarly, in the instance that information being transferred is not sensitive and/or confidential, it may be advantageous to transfer the schema package unencrypted. Regardless of the rationale used to determine whether to send encrypted or unencrypted schema information, it is to be understood that the subject invention can be employed to accommodate each circumstance.

Figure 4:
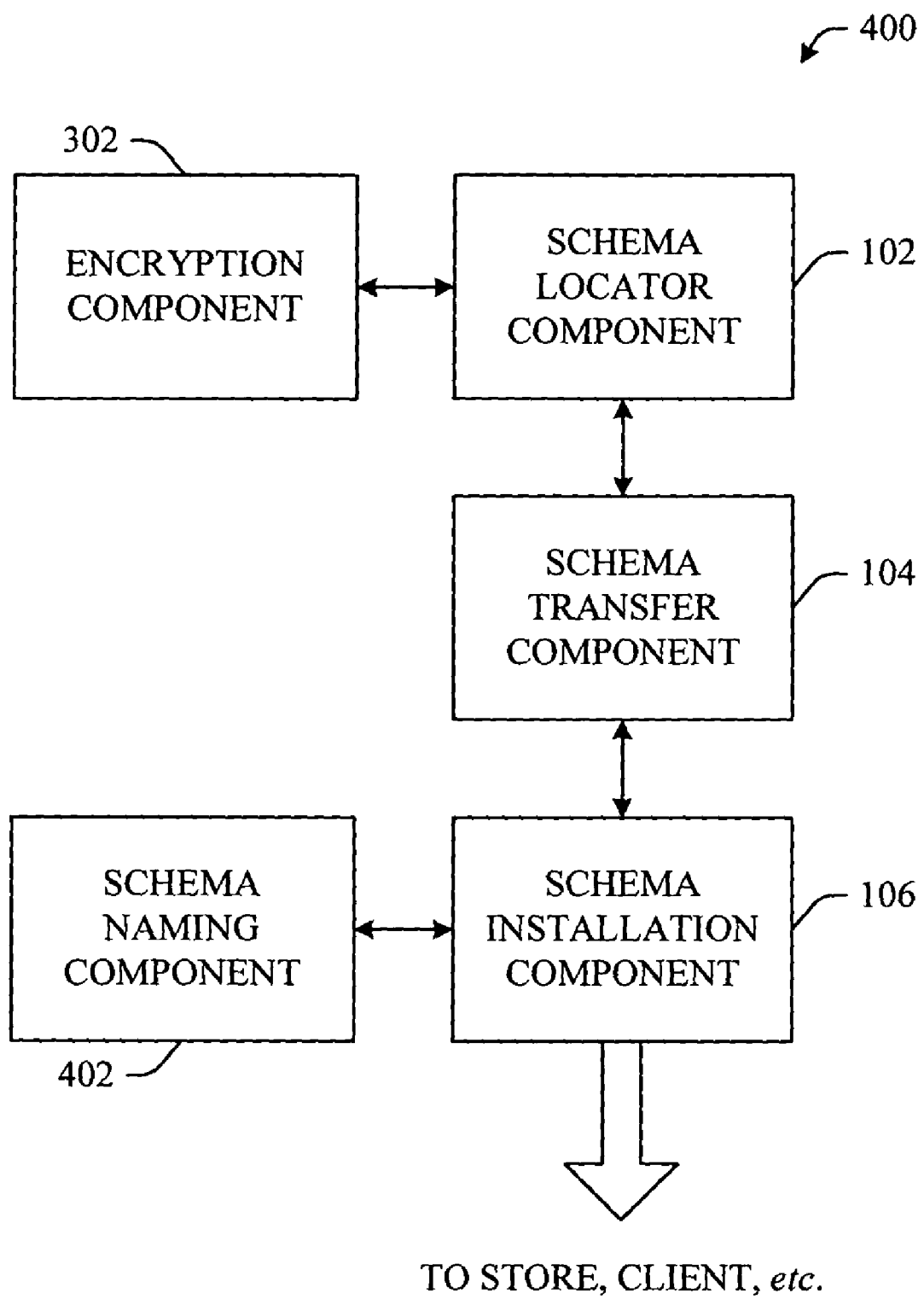
FIG. 4 illustrates a block diagram of a system that facilitates naming a schema in accordance with an aspect of the invention.

Yet another aspect of the invention is illustrated in FIG. 4. A system 400 that can facilitate and particularly enhance schema transfer authenticity is illustrated. In addition to the components described supra with reference to FIGS. 1 and 3, system 400 can include a schema naming component 402. In particular, schema naming component 402 can facilitate recognition of the unique name of the schema during the schema installation component 106. For example, a schema can be uniquely identified based at least in part on the cryptographic key used in signing the schema. It will be understood that, in cryptography, a numeric code that is combined in some manner with the data to sign, usually for security or integrity purposes, can be referred to as a key.

Figure 5:
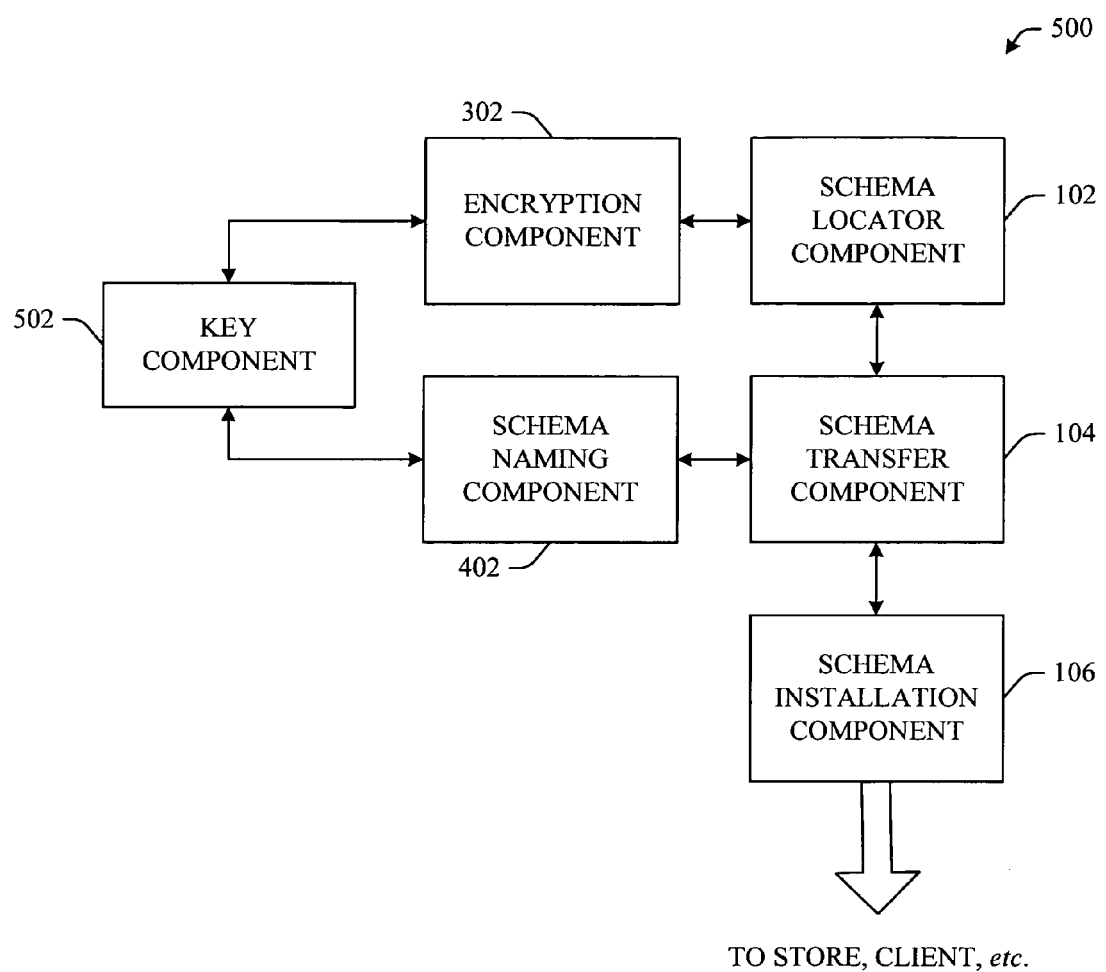
FIG. 5 is a block diagram of a system that illustrates a key component that effects uniquely signing and naming a schema package prior to motion in accordance with an aspect of the invention.

FIG. 5 illustrates an aspect of the invention utilizing a key component 502 to enhance security functionality of the invention. As described supra, any public/private cryptographic key pair can be employed in accordance with the aspect of FIG. 5. In one example, a public key cryptography technique can be employed to name (and sign) the schema data. Public key cryptography can refer to a cryptographic method that uses a two-part key (e.g., unique code) that includes a public and private component. In order to encrypt messages, the published public keys of the recipients are used. Accordingly, to decrypt the messages, the recipients use their unpublished private keys known only to them. In other words, the public key can refer to the published part of a two-part, public key cryptography system.

The private part of the key pair is known only to the owner. Accordingly, a recipient can use the unpublished private key to cryptographically sign the schema package. Note that signing is done at schema creation time, not during the actual transmission of the schema. The key component 502 is used during transmission and/or installation only to validate the schema's existing signature. This method can greatly enhance authenticity and integrity of the schema information. It should also be understood that any method of uniquely naming and/or signing data can be employed without departing from the spirit and scope of the invention and claims appended hereto.

Figure 6:
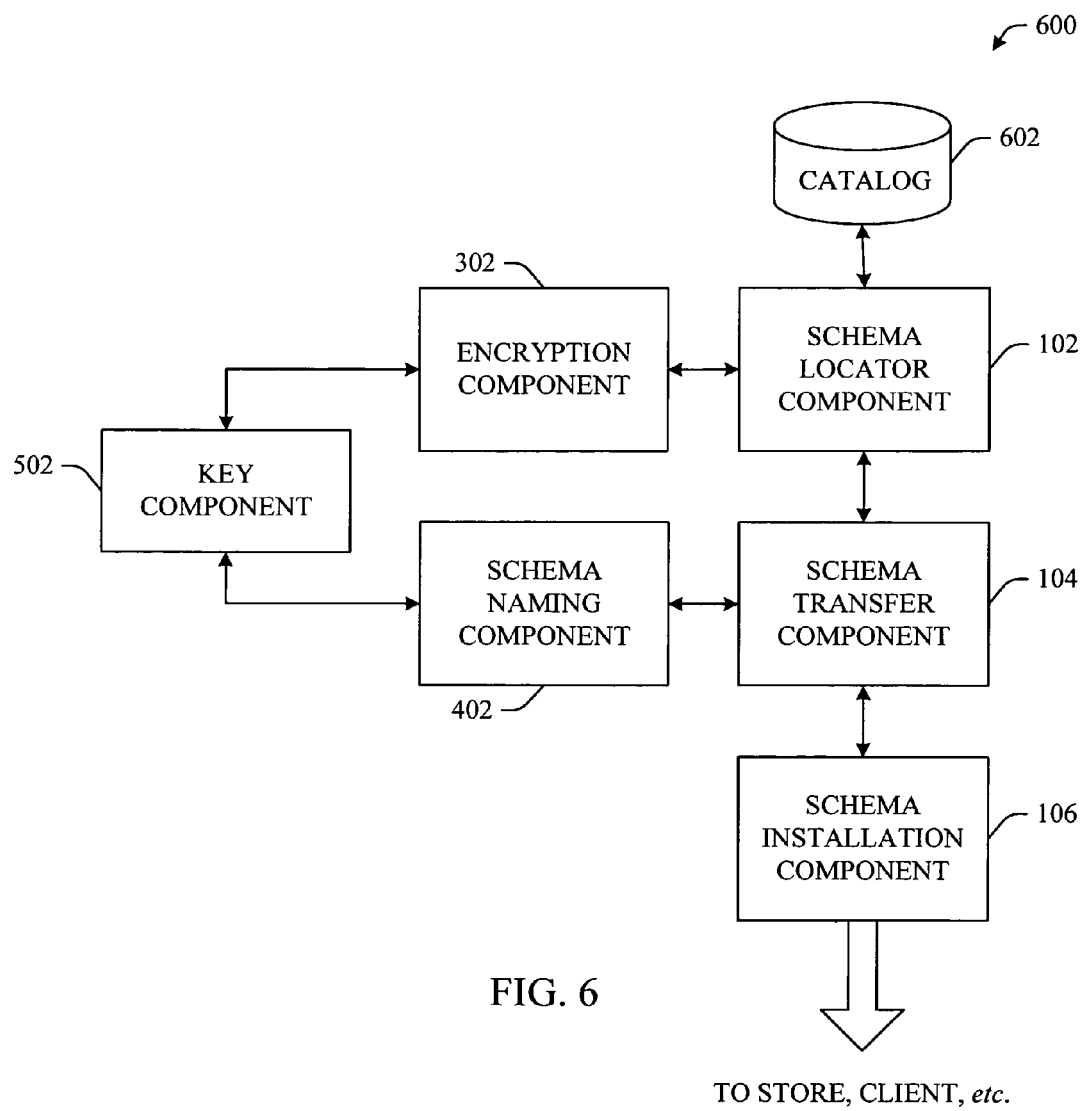
FIG. 6 illustrates a schema catalog component that can be employed by an aspect in connection with a schema locator component.

Still another aspect of the subject invention is illustrated in FIG. 6. System 600 illustrated in FIG. 6 identifies that a schema catalog component 602 can be employed as a search location for the schema locator component 102. In one aspect, the schema catalog 602 can be employed in a file store. Another aspect employs a client-based schema catalog or resource 602. In yet another aspect, the schema catalog is stored in or near the data instance itself, or in the same system as the data instance. It is to be understood that the subject invention contemplates that the schema catalog 602 can be located in any location desired. As well, schema catalog 602 can be located in multiple locations whereby the schema locator component 102 can effect searching multiple locations.

As described supra, the schema package must introduce a unique value (e.g., the key with which the schema package has been signed) that can be included within the schema and that is only available to the original author of the schema. It will be appreciated that this uniqueness can be enabled through the use of a public/private key pair. Therefore, if two users independently author a schema with the same simple name, upon combining a unique value with the simple name, the combined name can become globally unique. It will be understood that this value can become globally unique since only the original author has access to and is knowledgeable about the special value. It will further be appreciated that even if the simple name is the same as a simple name used by as someone else, this combination of simple name and key will be unique.

In order to ensure that these unique values can be maintained over time and can be globally unique, the unique value or key can be derived from a cryptographic key pair. Each author of a schema has a cryptographic key pair and can use the cryptographic key pair to sign a portion of the schema during the schema's creation (not shown). The signature from that schema can provide the key that is used in the name of schema to make it unique (e.g., via schema naming component 402) or the key may be provided separately through the key component 502.

In operation, a user can employ a cryptographic key pair, which only the user has, to sign the schema package during its creation to produce a signature. The signature can be hashed and the value of that hash is the value of the public key token which can be used as a unique value in the name (e.g., via naming component 402).

As previously stated, because each author only has access to their own cryptographic key pair, only they can create a unique value based on that key pair. Therefore, the name combined to form the simple name and the key token must be unique. Because the relationship between the signing key and the token used as part of the name are cryptographically verified during installation, i.e. by the schema installation component 106 in conjunction with the key component 502, no author could accidentally or purposefully use a token not associated with the key pair for which they have the private key. Additional discussion of these aspects of the invention are described in the Namespace section infra with reference to the figures that follow.

Integrity of the transmitted package (e.g., schema) is also addressed by the invention. For example, it is important to restrict access to the package by not allowing anyone to intercept the package, altering it, and re-submit the altered form in place of the original. It will be appreciated that the public key token and the cryptographic key pair can be reused to address these security issues.

Consider that a package has been received at the destination and it is desired to make sure that no one has changed the package during transmission. This verification can be accomplished by requiring that the package has been signed during its creation using a cryptographic key pair (not shown). In particular, a hash of the package can be employed whereby a digital signature can be applied over that hash. Therefore, the hash signed in a private key of the original key pair can be included.

When the destination receives the package, a local hash of the package content can be computed, the original hash can be decrypted using the public key of the key pair and the two values can be compared. If the values do not match, this is an indication that the package has been altered. If the values do match, the package must not have been altered.

One way a malicious agent could have altered the package along the path is if the agent altered the content of the package, recomputed the hash, and re-sign the hash and insert the re-signed hash into the package. However, in order to resign the hash, the malicious agent would have to have access to the private key portion of the key pair, which, they would not have. To this end, the package can be sent signed in a secure fashion. Therefore, the destination can be assured that the package, if verified, was not altered along the path. It will be appreciated that the strong name, the name given as a result of the anti-collision issue that contained a public key token, itself can be verified against the public key and verified to also be correct.

In order to install this schema onto the system, one aspect allows any "authorized user" to install it into the system (e.g., store). In other words, anyone that has write access to save data on the system can possess the necessary permissions to install a schema. It will be appreciated that, with this increased access, the barriers can be lowered and that anyone who works with data can use the functionality of this invention. The writing of this data is totally transparent to a user.

By introducing this "schema in motion" and this "just-in-time" schema installation, the subject invention can shield these mechanisms from the user. The user does not need to know that schema transfer and installation is occurring. In other words, to the user, anything they could do in the absence of schema motion, they can still do in the presence of schema motion.

One particularly novel aspect of the invention is the use of keying technology to sign a schema package. Additionally, it is particularly novel to include the public key token in the namespace type information.

Another issue addressed by this invention is the definition of package (e.g., schema) format. For example, it is important to restrict any negative impact on the receiver or destination machine. In this regard, the schema format can be defined such that it does not contain any code that could execute or that might contain a virus. In other words, the schema package can be defined such that it does not contain any method data. As part of the schema motion techniques of the invention, a description can be defined that puts restriction on the content of the package such that it does not contain destructive or malicious content.

Therefore, this invention can facilitate calling out a set of restrictions on the definition of the schema itself. For example, the invention can restrict the schema to include the description of the structure of the data itself and nothing else. It will be appreciated that when a user authors a schema, a couple of elements are authored: a definition of the structure of the type(s) and rich methods and functionality that are associated to the type(s). The described aspects of this invention are directed to a system and/or methodology that whereby the document (e.g., schema) that motions in this just-in-time schema installation contains only the data structure portion. Rich methods are not included in the transferred schema package. In these described aspects, the functionality (e.g., methods) does not motion and can be operated on differently than the structure of the data.

As described supra, data can only be stored in a file system store if all of the type information required for that instance is already installed in the store. In accordance therewith, the subject invention provides a novel secure system and/or methodology of allowing a schema to be transferred (with data or otherwise) and installed "just in time." In other words, schema information can be transmitted alone or in addition to other data thus enabling a destination device to install the schema information that corresponds to transmitted data.

Figure 7:
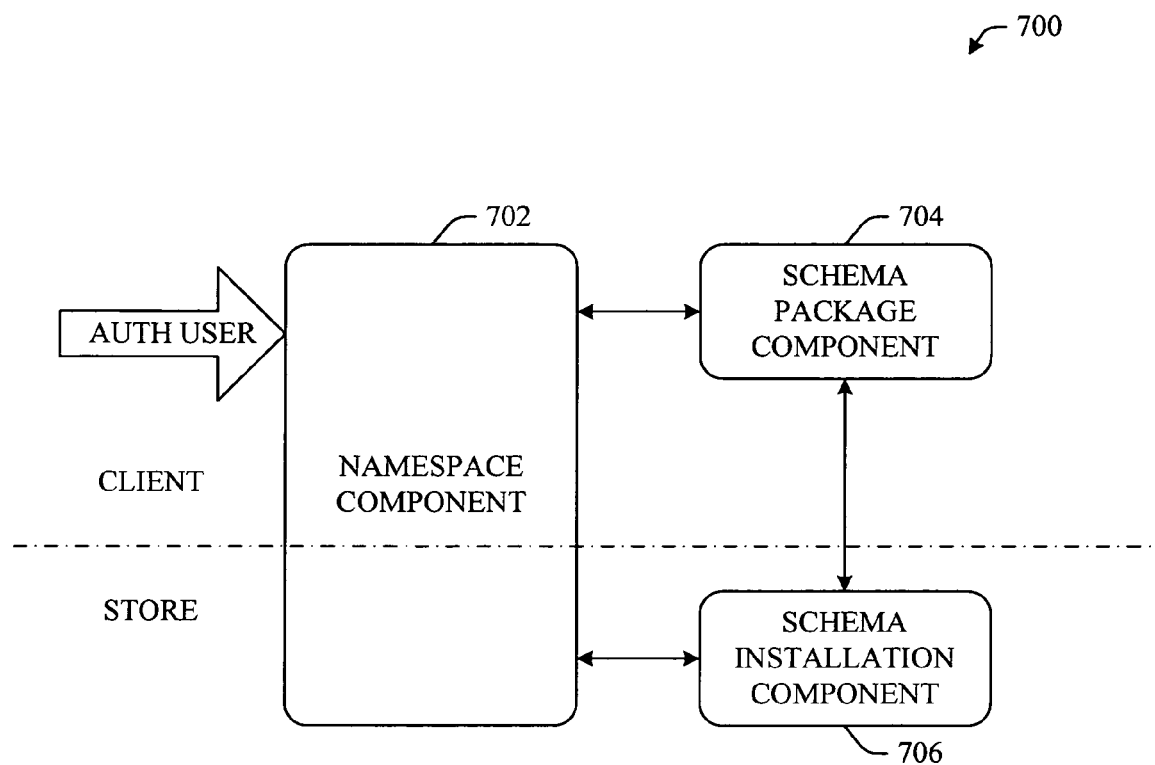
FIG. 7 illustrates a general component block diagram of a system that effects secure definition and "just-in-time" installation of a document in accordance with an aspect of the subject invention.

Referring now to FIG. 7, system 700 can include a namespace component 702, a schema package component 704 and a schema installation component 706. System 700 can facilitate "just-in-time" installation of a schema in accordance with an aspect of the invention.

As illustrated a "client" space and a "store" space are denoted by the dashed line illustrated in FIG. 7. Although the aspect illustrated and described in detail herein is directed to moving data from a client to a file system store, it is to be understood that the novel concepts of signing schemas and installing the same "just-in-time" can be employed in other scenarios without departing from the spirit and/or scope of the invention. For example, the novel functionality of the invention can be applied to data exchange between two disparate devices via the Internet, or directly between two different stores.

As illustrated in FIG. 7, this aspect can relieve a system of the "store down-level" problem described above. In particular, an authorized user (e.g., has write access) can access the namespace component 702. The namespace component 702 can be visible to the client and can include a list of all schemas installed in a store. The schema package component 704 is able to find and present a schema package (e.g., the form of the schema) to the store. The installation component 706 can facilitate installing the schema package into the store.

Figure 8:
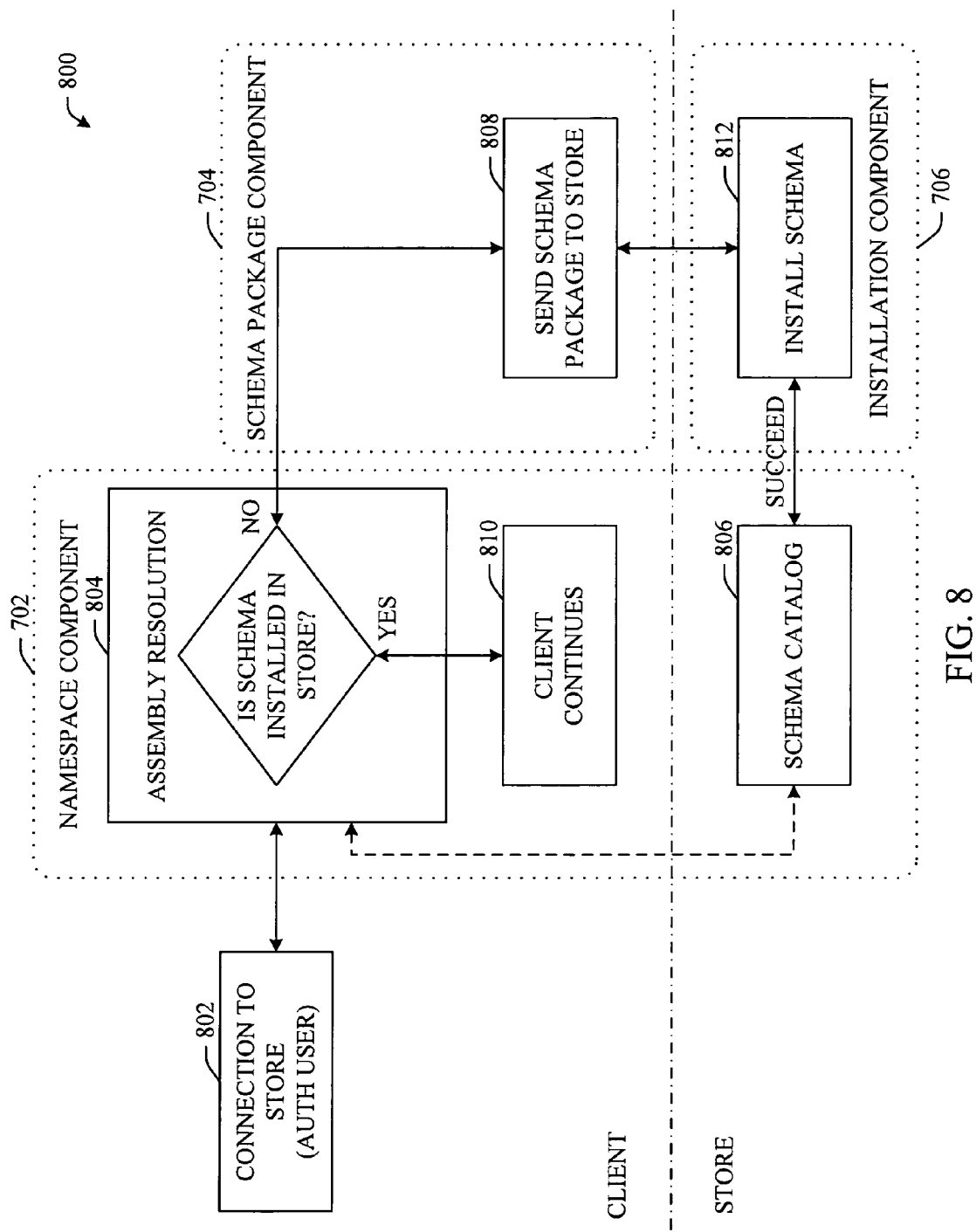
FIG. 8 illustrates an exemplary flow diagram of a client/store interaction to support "just-in-time" schema installation in accordance with a disclosed aspect.

Turning now to FIG. 8, an architectural flow diagram of a system 800 that facilitates transferring and/or installing a schema is shown. Generally, the system includes a namespace component 702, a schema package component 704 and an installation component 706. Each of these components will be discussed in greater detail infra. Effectively, FIG. 8 illustrates a client/store interaction that supports "just-in-time" schema installation.

As shown, the core components of the aspect shown in FIG. 8 are the namespace component 702 (e.g., includes a list of schemas installed in a store and visible to the client), the schema package component 704 (e.g., able to find and present a schema package to a store) and the installation component 706 (e.g., the installation of the schema package in a store). FIG. 8 and the remainder of this section examine how the above components are combined so that a client can connect to a store and save an instance for which the required schema is not yet installed in the store.

In order to provide more detail for the examples below assume that the following (simplified) schema is available to the client, but is not installed in the store:

<Schema Namespace="MySchema" . . . >
  <Type Name="MyType" BaseType="Base.Item"
    <Property               Name="MyProperty"
      Type="Types.String"/>
  </Type>
</Schema>

It will be understood that this example is provided merely to provide perspective to the invention and is not intended to limit the scope of the invention in any way.

At 802, assume a client has established a connection to the store. The client creates an instance of MyType and then attempts to save the instance to the store. In order for this operation to succeed the client must have write privileges to the store to which it is connected. Additionally, in order to save an instance of a particular type in the store, the store must have the relevant schema(s) installed. This invention describes a secure means of ensuring that the appropriate schema can be installed.

Namespace Component

Turning now to a discussion of the namespace component 702, as described above, the namespace component 702 is the list of schemas installed in a store and visible to the client. In operation, after the client has connected to a store at 802, a determination can be made whether the appropriate schema (s) are installed in the store at 804. This assembly resolution 804 employs a schema catalog 806 to make the determination. The format and structure of schema names are mutually understood by both client and store.

The set of schemas named in the schema catalog 806 collectively make up the schema namespace component 702. The namespace component 702 visible to a particular user connecting to a particular store can be determined by querying the schema catalog 806. In one aspect, the namespace component 702 includes a schema's fully-qualified name that includes a public-key token.

The schema catalog 806 can be used at least in the following key scenarios. The schema catalog 806 can be used for installation. In other words, when a schema is installed its name is included in the namespace component 702. The schema catalog 806 can also be used for negotiation. For example, the client can employ the schema catalog 806 to determine whether the required schemas are part of the namespace component 702. For instance, the catalog 806 can be employed to determine if the necessary schema(s) is available in order to persist a particular data instance.

As described above, each installed schema must have a fully-qualified name (e.g., named via schema naming component 402 of FIG. 4). The fully-qualified name of a schema can be a four-part name consisting of at least, or any combination of, the following elements: friendly-name, version number, culture setting, and public key token. The public key token is a unique value that relates to the public key of a cryptographic key pair that a particular company or developer possesses and that was used in the signing of the schema package (not shown). It will be appreciated that the private key of the pair can be kept secret while the public key can be distributed to consumers of a schema. In accordance therewith, only the company or developer with the private key can successfully generate and sign a schema that uses the corresponding public key token.

Continuing with the example, a schema's fully-qualified name can be the following. The first component, MySchema, can be the schema friendly name. Second, the version information can be Version=1.0.24.0. Culture=neutral can be designated as the culture setting. It is to be appreciated that the culture setting can optionally include a country code. A public key token string can be employed to enhance uniqueness and security to the schema. By way of example, the public key token could be the following combination of alphanumeric characters, "29989D7A39ACF230."

In accordance with the example, the storage system's name for "MyType" would therefore be:

[MySchema,1.0,*,29989D7A39ACF230].[MyType]

It is to be appreciated that the above-described example is included merely to provide context to the invention. The example is not intended to limit the scope of the invention, or claims appended hereto, in any way. In particular a public key could be utilized as a part of the name or be utilized in the schema catalog 806.

One novel aspect of the fully qualified name that can be employed by this invention is that the type's storage system name can include a public key token. Inclusion of this public key token can offer a number of benefits that are detailed below.

It will be appreciated that although the culture of schemas installed in the store is usually "neutral", culture setting can be included in strong names. As shown in the exemplary aspect above, in order to minimize the impact of this inclusion on name length, a value of "*" (or some other token) can be used to represent the common "neutral" case.

Schema Package Component

With reference now to the schema package component 704, the schema package component 704 can find and present the schema that is passed to a store. In operation and as illustrated in FIG. 8, if the client determines that a schema is required in order to save an instance to the store, a schema package can be presented to the store for installation (808). If a determination is made that the schema is already installed in the store, the client can continue at 810.

In accordance with the invention, the schema package can be a signed document that contains schema definition language information. The unit of installation of a schema in the store is a schema package having a strong name. A schema "strong name" can be the schema's fully-qualified name together with a digital signature or other unique designation. As described supra, the signature can be generated using the private key that was available at schema development time. A schema's fully qualified name can be guaranteed to be unique by virtue of the public-key token and the version number. The signature can also be employed to determine that the schema package made available by the schema package component 704 has not been tampered with during transit.

To summarize, identifying a schema using a strong name can give the following benefits. First, strong names can guarantee name uniqueness by relying on unique key pairs. It will be appreciated that no one can generate the same schema name as someone else because a schema generated with one private key must have a different public key token than a schema generated with another private key.

Secondly, strong names can protect the version lineage of a schema. A strong name can ensure that no one else can produce a subsequent version of a schema because subsequent versions must have the same public key token. In accordance therewith, a user can be sure that a later version of the schema comes from the same publisher that created the earlier version. Strong names provide a strong integrity check. A digital signature can guarantee that the contents of the schema have not been changed since it was signed.

The novel signing of a schema in accordance with the invention can also facilitate a system to eliminate the threat of schema squatting. This threat occurs when the installation or presence of one schema adversely affects the installation or proper functioning of another schema. Strong names ensure that the named components of schema, especially the schema's namespace 702, cannot collide with other schemas. A novel feature of strong names in this regard comes from the presence of the public key token. This token is related mathematically to a cryptographic key pair. Use of the token in a given schema requires the possession of the private key of that key pair. Since only the original schema owner has the private key, only the original schema owner can be sure to generate the token and the signed hash that matches the token through its public key. Accordingly, this provides protection against both accidental and intentional schema squatting.

Schema Package Installation Component

With reference again to FIG. 8, once a client has determined that the store does not have the required schema(s) and has presented the corresponding schema package(s) to the store at 808, those schema package(s) can be installed in the store at 812.

In accordance with an aspect, a strong named schema package provided by the schema package component 704 is the unit of schema installation. A schema package does not include custom code. Additionally, the schema package strong name can ensure that the package has not been tampered with prior to installation. Once the installer has verified the schema's integrity (e.g., via a hash of schema package contents), the installation of the schema can proceed.

The user installing the schema must be an authorized user (e.g., has write access). Successful installation of the schema package can result in the schema catalog 806 being populated with details of the new schema as illustrated in FIG. 8.

A novel aspect of this aspect is that only schema information (e.g., a definition of the form of the data) can be introduced using this mechanism. To ensure that the approach is secure and available to users without administrator privileges, no custom code (e.g., managed code, SQL code, etc.) or other means of affecting system state should be introduced using this mechanism.

In another aspect, an application program interface (API) layer can provide a mapping from the implementation of the object to the storage system name such that the end-user need only work with the "friendly-name" of the type. In this aspect, the user would not have to be aware of the fully-qualified name (e.g., strong name that includes the public key token), which is used in the storage system. The fully-qualified name can be hidden from the user.

In yet another aspect, any object that can be defined using the declarative language of the storage system (e.g., a database table) can be signed and installed in accordance with the invention. In other words, any object that can be defined using the declarative language of the storage system can be signed such that its name includes a public key token or other uniquely identifying descriptor.

In other words, the novel schema motion aspect described herein is directed toward the structure of the data. However, this invention can be applied to any storage system or any other system where a declarative form of the data is employed. Therefore, in another aspect, this invention can be applied to a relational database system. In accordance therewith, instead of the type name being used as in the schema example described herein, the table name can be used and modified to include a public key token, public key or other unique identifying characteristic as described herein. Similarly, in another aspect, this invention can be applied to an XML system. In accordance therewith, XML namespaces could be made to include a public key token, public key or other unique identifying characteristic and their matching XSDs, DTDs or other schema information could contain signatures with appropriately signed hashes.

To further describe this alternative aspect, in a single database, a user can create a table called MyCustomer. Another user can also create a table called MyCustomer and thereafter install the table in the same database as the original MyCustomer table. In accordance with the novelty of this invention, this scenario can be employed because the actual name of the table for which it will be installed in the database can include a public key token. Therefore, the two tables will be distinct through the utilization of this public key token (or other unique identifier).

It is to be understood that the subject invention can be employed in any data transmission and/or installation situation. Although the aspects described herein are directed to database applications, it is to be appreciated that the invention is not to be limited to database applications. For example, the invention can be employed for communicating over the Internet or otherwise. In this Internet communication scenario, the devices still need to agree on the schema therefore, the novel functionality of the invention can be applicable to this and other types of data transmission and/or communication.

Figure 9:
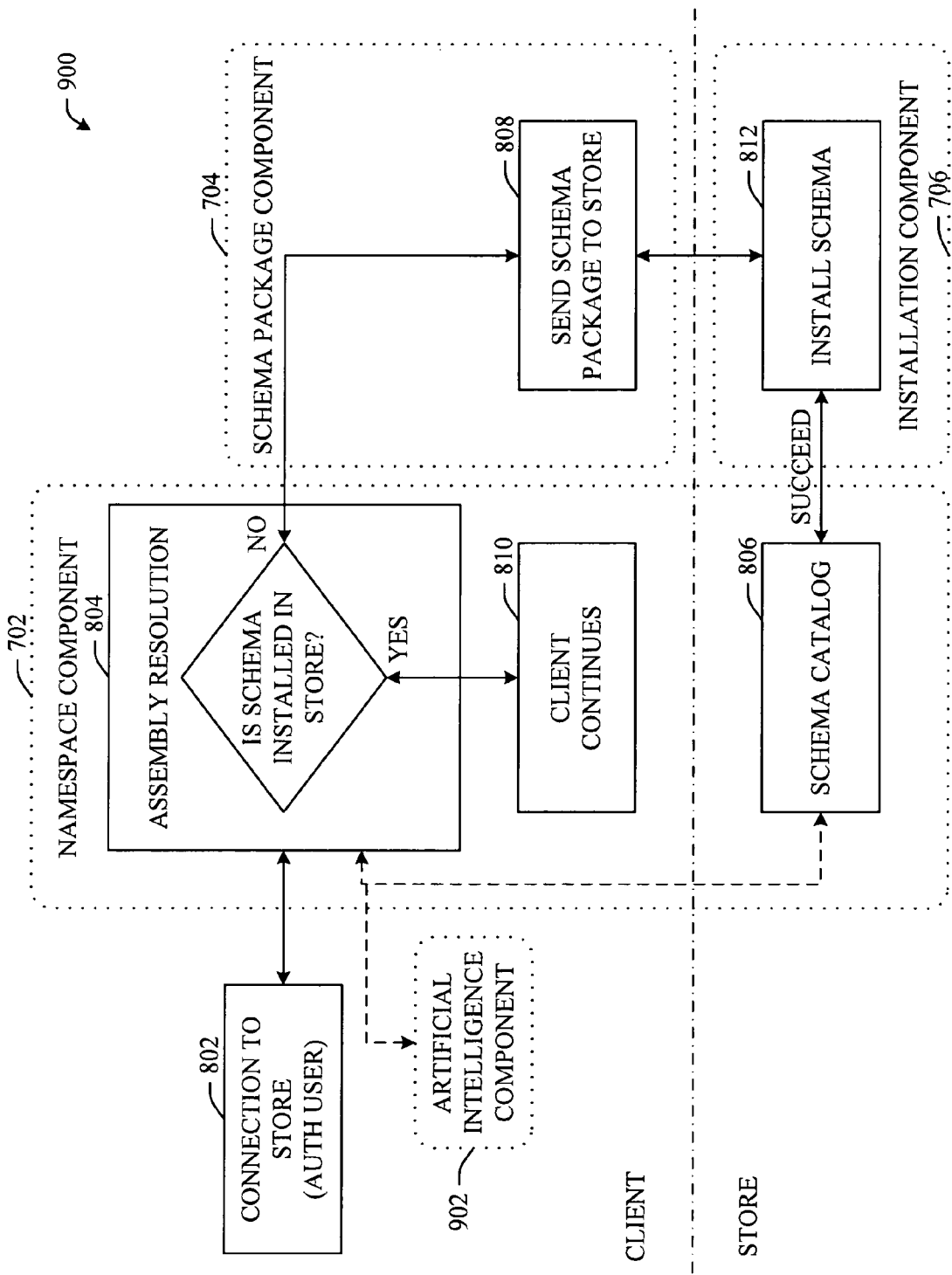
FIG. 9 illustrates a client/store interaction including an artificial intelligence-based mechanism in accordance with an aspect of the invention.

FIG. 9 illustrates a system 900 that employs AI, which facilitates automating one or more features in accordance with the subject invention. The subject invention (e.g., in connection with resolving, installing, . . . ) can employ various AI-based schemes for carrying out various aspects thereof. For example, a process for determining when to transmit a secure (e.g., signed) schema document can be facilitated via an automatic classifier system and process. Moreover, where the schema catalog 806 is distributed over several locations, the classifier can be employed to determine which location will be selected for schema presence determination.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of file systems and stores, for example, attributes can be words or phrases or other data-specific attributes derived from the words (e.g., database tables, the presence of key terms), and the classes can be categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a schema package is transferred from one location to another.

Figure 10:
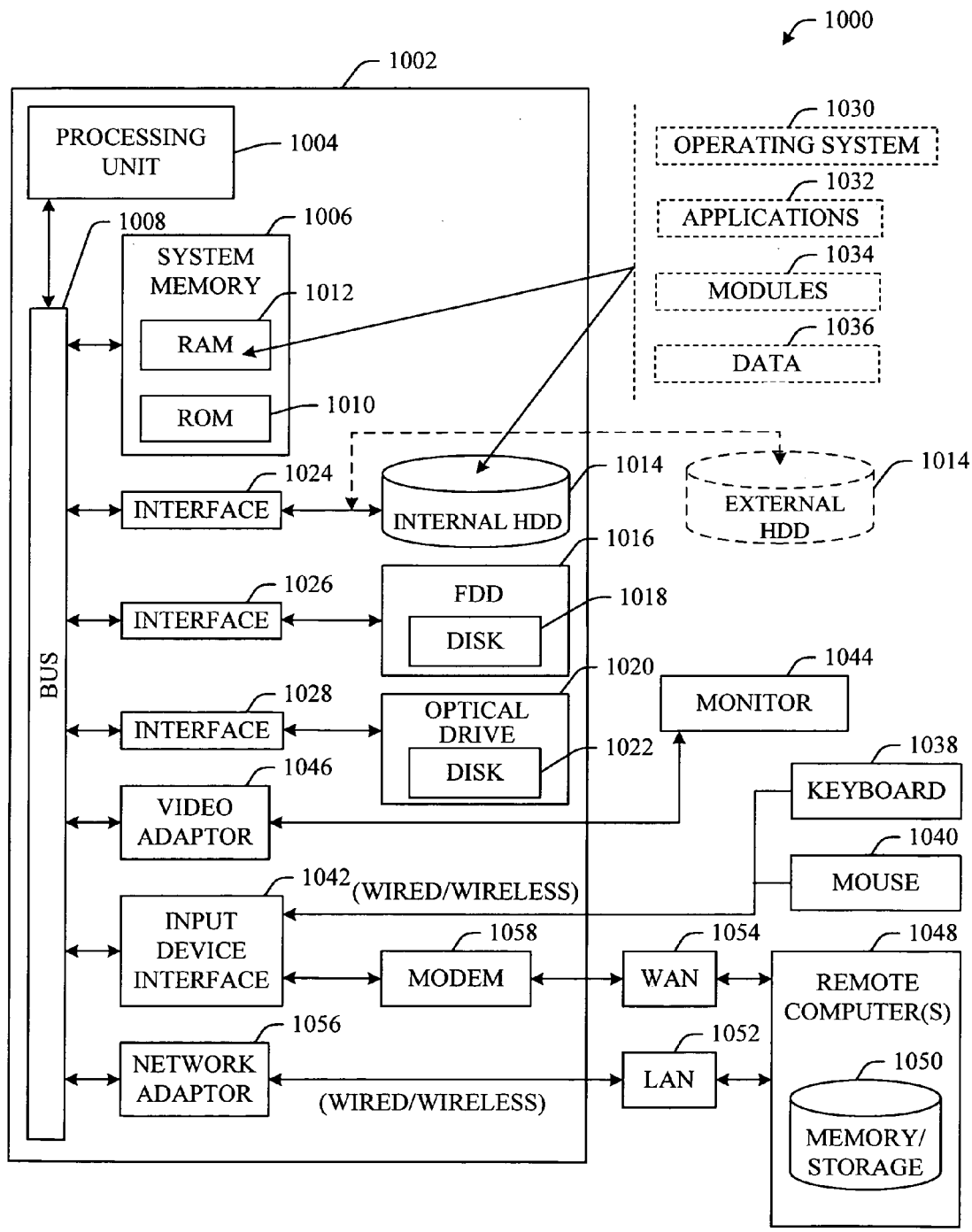
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject invention, FIG. 10 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
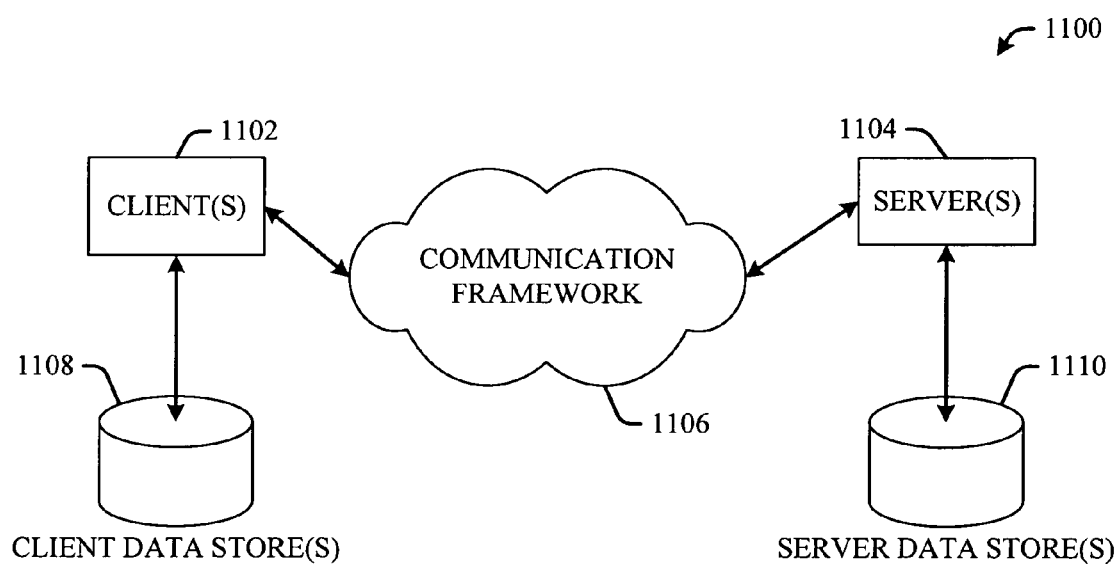
FIG. 11 illustrates a schematic block diagram of an exemplary computing environment in accordance with the subject invention.

Referring now to FIG. 11, there is illustrated a schematic block diagram of an exemplary computing environment 1100 in accordance with the subject invention. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of transferring a schema between a client and a store, the method comprising:
    employing a processor to execute computer executable instructions stored on a computer readable storage medium to implement the following acts:
        creating an instance of a data type at the client for storage in the store, the data type defined by a schema;
        ascertaining that the schema defining the data type is not installed in the store;
        upon determining that the schema is not installed in the store:
            automatically locating a schema package defining the data type from a schema catalog, based on a classifier that predicts an automation preference of a user, the classifier being a function that maps an input attribute vector to a confidence associated with the automation preference and the schema package defining a unit of installation for the schema;
            signing the schema package with a digital signature, the digital signature providing an authentication for a subsequent installation of the schema package;
            transferring the schema package to the store; and
            installing the schema package in the store prior to persisting the data type instance in the store.

2. The computer-implemented method of claim 1, wherein the schema package describes a data structure of a document.

3. The computer-implemented method of claim 1, wherein the act of signing the schema package includes signing with a key.

4. The computer-implemented method of claim 3, further comprising naming the schema with a unique name.

5. The computer-implemented method of claim 4, wherein the unique name includes a token mathematically related to the key used to sign the schema package.

6. The computer-implemented method of claim 5, the unique name further including at least one of a name element, a version number element, or a setting.

7. The computer-implemented method of claim 1, wherein the ascertaining further comprises querying a namespace component that includes a list of all schemas installed in the store.

8. The computer-implemented method of claim 7, wherein the namespace component is implemented in the data store.

9. The computer-implemented method of claim 1, wherein the schema catalog is implemented on at least one of a client, as part of a data instance, or a network as a remotely accessible service.

10. The computer-implemented method of claim 1, further comprising transferring a document defined by the schema from the client to the store.

11. The computer-implemented method of claim 10, wherein the act of installing the schema package includes installing the schema package just-in-time based at least in part on the transferring of the document.

12. The computer-implemented method of claim 10, wherein the act of installing the schema package includes delaying an installation of the schema package based at least in part on the transferring of the document.

13. The computer-implemented method of claim 1, further comprising predicting a user intention as a function of a criterion.

14. The computer-implemented method of claim 1, further comprising automating an action by employing a rules-based logic.

15. A system to facilitate transfer of an electronic document from a client to a store, comprising:
- a memory having computer executable components stored thereon; and
- a processor communicatively coupled to the memory, the processor configured to execute the computer executable components, the computer executable components comprising:
- a locator component configured to perform a schema query on a schema catalog to determine whether a schema required to persist the electronic document is present in the store;
  - a transfer component configured to perform a schema transfer of a schema package to the store when the locator component determines that the schema is not present in the store, the schema package signed with a digital signature prior to the schema transfer and defined as a unit of installation of the schema, the digital signature providing an authentication for a subsequent installation of the schema package wherein the transfer component includes an artificial intelligence component configured to automate the schema transfer by automatically locating the schema package based on a classifier that predicts an automation preference of a user, the classifier being a function that maps an input attribute vector to a confidence associated with the automation preference; and
  - an installation component configured to perform a schema installation of the schema package in the store prior to persisting the electronic document in the store.

16. The system of claim 15, wherein the schema package describes a data structure of the electronic document.

17. The system of claim 16, wherein the digital signature is computed for the schema package using a key prior to the schema transfer.

18. The system of claim 17, further comprising a naming component configured to name and install the schema package with a unique name based at least in part on the key.

19. A computer-readable storage medium, comprising computer-readable instructions, the computer-readable instructions including instructions for causing at least one processor to perform at least the following acts:
- determining whether a schema required to persist an instance of a data type is installed in a store;
- automatically locating a schema package defining the data type from a schema catalog upon determining that the schema is not installed in the store based on a classifier that predicts an automation preference of a user, the classifier being a function that maps an input attribute vector to a confidence associated with the automation preference, and the schema package defining a unit of installation of the schema;
- signing the schema package with a digital signature prior to a transfer using a public encryption key, the unique digital signature providing an authentication for a subsequent installation of the schema package;
- naming the schema package with a unique name, the unique name including at least a friendly name element, a version number element, a culture setting, and a public key token, wherein the public key token is a unique value derived from the public encryption key; and
- installing the schema package in the store.

* * * * *

UNITED STATES PATENT AND TRADEMARK OFFICE
CERTIFICATE OF CORRECTION

PATENT NO. : 7,788,227 B1  Page 1 of 1
APPLICATION NO. : 11/367212
DATED : August 31, 2010
INVENTOR(S) : David J. Nettleton et al.

It is certified that error appears in the above-identified patent and that said Letters Patent is hereby corrected as shown below:

In column 10, line 27, after ""Base.Item"" insert -- /> --.

In column 18, line 45, in Claim 7, after "of" delete "all".

Signed and Sealed this
Seventeenth Day of May, 2011

David J. Kappos
*Director of the United States Patent and Trademark Office*